No. 784,031. PATENTED MAR. 7, 1905.
M. E. BUCK.
BRIDLE BIT.
APPLICATION FILED AUG 9, 1904.
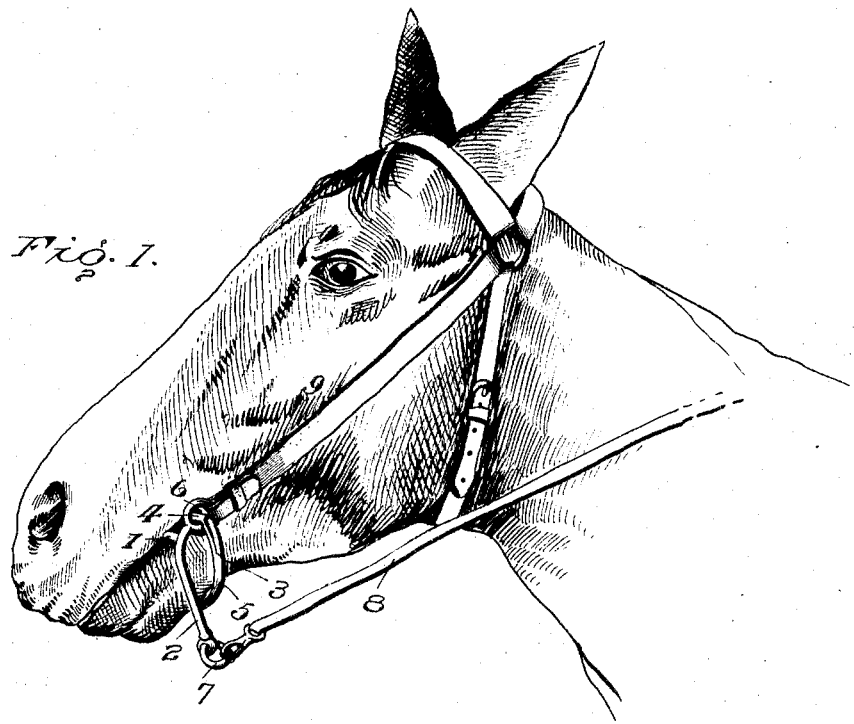
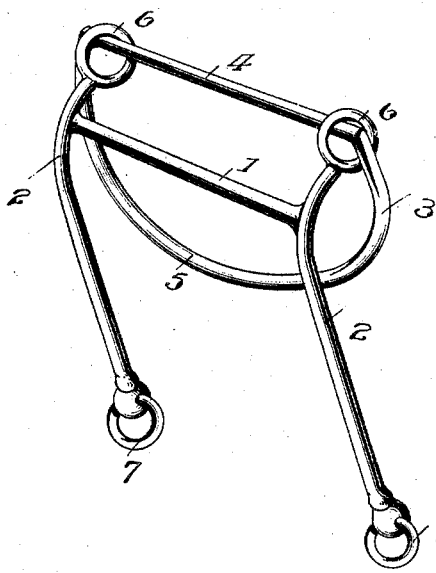
Inventor
Merrill E. Buck.

No. 784,031. Patented March 7, 1905.

UNITED STATES PATENT OFFICE.

MERRILL E. BUCK, OF BOWLING GREEN, FLORIDA.

BRIDLE-BIT.

SPECIFICATION forming part of Letters Patent No. 784,031, dated March 7, 1905.

Application filed August 9, 1904. Serial No. 220,106.

*To all whom it may concern:*

Be it known that I, MERRILL E. BUCK, a citizen of the United States, residing at Bowling Green, in the county of De Soto and State of Florida, have invented certain new and useful Improvements in Bridle-Bits, of which the following is a specification.

This invention provides a novel form of bridle-bit which will prevent the animal from taking the bit between the teeth, thereby enabling a fractious steed to be readily brought into subjection and control, the bit under ordinary conditions being easy upon the animal, but severe when occasion requires, to enable control of the animal being assured.

The invention consists, essentially, of a curb-link, in combination with a stiff bit, the parts being arranged to provide companion mouth-bars and a bow for embracing the lower jaw, said mouth-bars being forcibly separated when drawing upon the lines attached to the longer arms of the cheek-pieces.

The invention further consists of the novel features and details of construction, which hereinafter will be more particularly set forth, illustrated, and finally claimed.

In the accompanying drawings, forming a part of the specification, Figure 1 is a perspective view of a bridle provided with a bit embodying the invention and showing the same applied. Fig. 2 is a perspective view of the bit divested of all harness.

Corresponding and like parts are referred to in the following description and indicated in both views of the drawings by the same reference characters.

The bit comprises a mouth-bar 1, integral cheek-pieces 2, and a curb-link 3, the latter comprising a bar 4 and a bow 5, the link being of approximately D form. The bar 4 and bow 5 are preferably of integral formation. The cheek-pieces 2 are slightly curved near one end and terminate in rings 6, in which is supported the bar 4. Rings 7 are loosely fitted to the extremities of the long arms of the cheek-pieces and receive the driving-lines 8, which may be attached thereto by means of a snap-hook or in any accustomed manner. The headstall 9 is attached to the rings 6 and holds the bit in the mouth of the animal. The mouth-bar 1 is arranged near the ends of the cheek-pieces 2, provided with the rings 6, and since it coincides with the axial line upon which said cheek-pieces turn it marks the point between the short and the long arms comprising said cheek-pieces.

The curb-link 3 has its bar 4 let into the rings 6 in any determinate way and constitutes a mouth-bar supplementing the action of the mouth-bar 1 when drawing upon the lines 8 to press the jaws of the animal apart to prevent the taking of the bit and holding it between the teeth. The bow 5 embraces the lower jaw and is drawn forcibly against the same when pulling upon the lines 8, thereby inflicting punishment sufficient to bring the animal under control.

Having thus described the invention, what is claimed as new is—

1. A bridle-bit comprising a mouth-bar, cheek-pieces, and a curb-link of approximately D form having the straight bar supported in the cheek-pieces and adapted to enter the mouth, and the bow to embrace the lower jaw of the animal, substantially as set forth.

2. A bridle-bit comprising a mouth-bar, cheek-pieces at the ends of the mouth-bar comprising short arms having rings at their extremities, and a curb-link of approximately D form having its straight bar supported in said rings of the cheek-pieces, substantially as set forth.

3. A bridle-bit comprising a mouth-bar, integral cheek-pieces projected to unequal distances from said mouth-bar to provide long and short arms, the short arms terminating in rings, said cheek-pieces having the end portions provided with the rings slightly curved, and a curb-link of approximately D form having its straight bar supported in the rings of said cheek-pieces, substantially as specified.

In testimony whereof I affix my signature in presence of two witnesses.

MERRILL E. BUCK. [L. S.]

Witnesses:
W. S. BIVINS,
HOSEA ALBRITTON.